(12) United States Patent
Kotha et al.

(10) Patent No.: US 12,722,435 B2
(45) Date of Patent: Sep. 1, 2026

(54) AUTOMATION IN ESTIMATION OF CENTER LINKAGE OF AN IMPLEMENT

(71) Applicant: DEERE & COMPANY, Moline, IL (US)

(72) Inventors: Vamshi Sai Ramakrishna Reddy Kotha, Hyderabad (IN); Mahesh Bothe, Pune (IN); Nikhil Tagalpallewar, Kinwat (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/060,977

(22) Filed: Feb. 24, 2025

(65) Prior Publication Data

US 2026/0131606 A1 May 14, 2026

(30) Foreign Application Priority Data

Nov. 13, 2024 (IN) ............................ 202421087404

(51) Int. Cl.

*B60D 1/36* (2006.01)
*B62D 13/06* (2006.01)
*G06T 7/73* (2017.01)
*G06T 7/80* (2017.01)
*B60D 1/00* (2006.01)

(52) U.S. Cl.

CPC ............... *B60D 1/36* (2013.01); *B62D 13/06* (2013.01); *G06T 7/73* (2017.01); *G06T 7/80* (2017.01);

(Continued)

(58) Field of Classification Search

CPC ...... B60D 1/36; B60D 2001/008; G06T 7/80; G06T 7/73; G06T 2200/24;

(Continued)

(56) References Cited

U.S. PATENT DOCUMENTS 7,171,769 B2 * 2/2007 Schultz ................ E02F 3/7627 37/906
8,038,166 B1 10/2011 Piesinger (Continued)

FOREIGN PATENT DOCUMENTS

DE 102020127088 A1 5/2021
EP 3624578 A1 3/2020

(Continued)

OTHER PUBLICATIONS

Extended European Search Report and Written Opinion issued in European Patent Application No. 25203013.5 dated Apr. 17, 2026, in 09 pages.

*Primary Examiner* — Kerri L McNally

(57) ABSTRACT

A back-up assist system for coupling a work vehicle with an adjustable implement mounting arrangement and an implement having a vision system, a user interface, a repository module, and a processor. A plurality of markers are provided on the adjustable implement mounting arrangement and the implement. The vision system scans each of the marker to generate corresponding pre-scanned signals and dynamic-scanned signals, respectively, in the implement attached configuration and the implement detached configuration. The back-up assist system and the method thereof, helps in guiding the tractor to connect with the implement with precision without necessitating additional manpower for such activity.

20 Claims, 11 Drawing Sheets

(52) U.S. Cl.
CPC .... *B60D 2001/008* (2013.01); *G06T 2200/24* (2013.01); *G06T 2207/30204* (2013.01); *G06T 2207/30252* (2013.01)

(58) Field of Classification Search
CPC ........... G06T 2207/30204; G06T 2207/30252; B62D 13/06
USPC .......................................................... 340/431
See application file for complete search history.

(56) References Cited

U.S. PATENT DOCUMENTS

| | | | | |
|---|---|---|---|---|
| 9,374,562 | B2 | 6/2016 | Trombley et al. | |
| 10,882,555 | B2 | 1/2021 | Huger et al. | |
| 2015/0066296 | A1* | 3/2015 | Trombley | B62D 13/06 701/41 |
| 2016/0059780 | A1* | 3/2016 | Lavoie | B60W 50/14 348/118 |
| 2017/0290258 | A1* | 10/2017 | Mollick | A01B 63/023 |
| 2021/0127544 | A1* | 5/2021 | Ohrstrom | A01B 59/067 |
| 2022/0400600 | A1* | 12/2022 | Mollick | A01B 59/004 |

FOREIGN PATENT DOCUMENTS

| | | | |
|---|---|---|---|
| EP | 3552474 | B1 | 8/2021 |
| IN | 467848 | | 11/2023 |
| JP | 2023177820 | A | 12/2023 |
| KR | 20230078128 | A | 6/2023 |
| WO | WO 2018210990 | A1 | 11/2018 |
| WO | WO 2021191099 | A1 | 9/2021 |
| WO | WO 2024142076 | A1 | 7/2024 |

* cited by examiner

AUTOMATION IN ESTIMATION OF CENTER LINKAGE OF AN IMPLEMENT

CROSS-REFERENCE TO RELATED APPLICATIONS

This application claims priority under 35 U.S.C. § 119 to patent application IN 202421087404, filed on 13 Nov. 2024, the disclosure of which is incorporated herein by reference.

FIELD OF THE DISCLOSURE

The present disclosure relates to the field of attaching a work vehicle to an implement.

BACKGROUND OF THE DISCLOSURE

In a field operation, when an operator is required to reverse a work vehicle towards an implement, it is required that the center linkages of both the implement and the hitch or an implement connector are inline. To ensure connection between the implement and the work vehicle, exact position of the center linkage of the work vehicle and the implement connector is required. Manual guidance is majorly utilized for such making connection wherein a second operator guides the operator to traverse the work vehicle backwards towards the implement and thereby assisting the connection. Additionally, the second operator also guides the operator to increase or decrease the height of the work vehicle.

An alternate method is to provide a system to physically measure the position of the hitch and the implement along the x, y and z direction using a measuring tape before performing an operation. The measuring tape indicates the positioning elements. However, if the operator changes the location of any of the positioning element on the implement or on the implement connector, the measurement is required to be completed again. Additionally, if the implement is changed, then the operator needs to follow the same procedure of finding the translation using the measuring tape. Due to this physical measurement of translation, valuable operational time is wasted which may result in operator fatigue and downtime.

Additionally, the operator, while reversing the work vehicle towards the implement, is required to constantly look back to keep track of the implement. This is required even if the second operator is available. This may cause delay in the attachment operation in addition to potentially causing operator fatigue.

Thus, attaching and detaching an implement from a work vehicle is a necessary task for switching between various operations to be performed by a work vehicle. However, this changeover task may be cumbersome and time consuming. In view of the above, there is a need for making it easier to attach and detach an implement from a work vehicle.

Other objects of the present disclosure will be apparent when the description of the disclosure is read in conjunction with the accompanying drawings. The accompanying drawings provided herein are merely illustrative and are not intended to limit the scope and ambit of the present disclosure.

SUMMARY OF THE DISCLOSURE

The present disclosure envisages achieving at least one of the following objects: provide a system for assisting an operator while reversing towards an implement for connection therewith; provide a system to facilitate exact location of a center connection point of the implement and the hitch of a work vehicle; determine an estimated angle and distance between an implement and a work vehicle; and determine a target height of the hitch with respect to the implement.

In accordance with the present disclosure there is provided a back-up assist system for coupling a work vehicle with an implement in a detached configuration to an attached configuration via at least a vehicle side connector and a center vehicle connector of the work vehicle with corresponding at least one implement side connector and a center implement connector of the implement, respectively. Each of the at least one vehicle side connector, the center vehicle connector, the implement side connector and a center implement connector are at an actual distance from a predefined point of the vehicle. The back-up assist system has a user interface, a plurality of markers, a vision system, a repository module, and a processor.

The user interface has an input interface and a display interface. The user interface is adapted to receive one or more user inputs via the input interface. The markers are disposed proximate to each of the center vehicle connector, the center implement connector, the first attachment side connector, and the second attachment side connector. The vision system is mounted on the vehicle via a mounting point at a predefined distance with respect to a predefined vehicle point. The vision system is configured to scan each of the markers and generate a plurality of pre-scanned signals and a plurality of dynamic-scanned signals, respectively, in the implement attached configuration and the implement detached configuration, corresponding to the mounting point. The repository module is communicably coupled to the user interface and the vision system. The repository module is adapted to receive the user input, the plurality of pre-scanned signals, and the plurality of dynamic-scanned signals. The processor is communicably coupled to the repository module. The processor is configured to generate a plurality of calibration signals and a visual guidance path with respect to the predefined vehicle point. Each of the plurality of pre-scanned signals and a plurality of dynamic-scanned signals are transposed corresponding to the plurality of calibration signals.

The user input is selected from a group consisting of a type of implement and a plurality of dimensions of the vehicle with respect to the predefined point. The user input is a distance of each of the center vehicle connector, the first attachment side connector, and the second attachment side connector with respect to the predefined point. The predefined point being a rear axle of the vehicle. The user input determines a vehicle coordinate. The vehicle coordinate corresponds to an actual distance of the center vehicle connector, the first attachment side connector, the second attachment side connector, and the vision system with respect to the predefined point on the vehicle. The fixed point is a center of the rear axle of the vehicle.

The marker is a machine-readable design selected from a group consisting of a barcode, a QR-code, and a checkered pattern. The marker is applied and may be positioned on a paper backing. The markers are mounted on the work vehicle and the implement with an adhesive. Alternatively, the markers are painted on the work vehicle and the implement. The pre-scanned signals have a scanned image of the marker associated with the center vehicle connector. The pre-scanned signals have a scanned image of at least one of the markers associated with the first attachment side connector and the second attachment side connector. The dynamic-scanned signals have a scanned image of the marker associated with the center vehicle connector. The plurality of dynamic-scanned signals indicate the markers associated with the first attachment side connector and the second attachment side connector. The plurality of calibration signals corresponds to each of the dynamic-scanned signals. The plurality of pre-scanned signals and the plurality of dynamic-scanned signals are determined with respect to the mounting point. The plurality of pre-scanned signals and the plurality of dynamic-scanned signals are calibrated corresponding to each of the plurality of calibration signals. The plurality of calibration signals and the visual guidance path are selectively displayed on the user interface via the display interface.

The method of operating the work vehicle using the back-up assist system for assisting back-up of a work vehicle towards an implement for coupling a first vehicle side connector, a second vehicle side connector, and a center vehicle connector of the work vehicle and a first attachment side connector, a second attachment side connector, and a center attachment connector of the implement. The vision system scans the marker, associated with center vehicle connector, the first attachment side connector, and the second attachment side connector, and when in proper position, the work vehicle is coupled to the implement. A plurality of pre-scanned signals is determined corresponding to the step of scanning. A vision system coordinate is allocated to each pre-scanned signal corresponding to the position of each of the markers with respect to the vision system. Each of the pre-scanned signals is reposited. Steering the work vehicle, spaced apart from the implement, towards the implement. Successive frames, in real time, by the vision system is acquired for at least one of the markers, during steering. A plurality of dynamic-scanned signals is configured corresponding to the pre-scanned signals. Each of the dynamic-scanned signals is calibrated to a vehicle coordinate calculated with respect to a fixed point of the work vehicle. A center line is determined connecting the center vehicle connector of the work vehicle and the center attachment connector of the implement. Connection lines are generated which connect the first vehicle side connector and a second vehicle side connector of the work vehicle with the first attachment side connector and the second attachment side connector of the implement, respectively. A visual guidance path is estimated between the work vehicle and the implement, corresponding to an angle therebetween. The position of the first vehicle side connector, the second vehicle side connector and the center vehicle connector are adjusted corresponding to the step of acquiring, determining, and generating.

Other features and aspects will become apparent by consideration of the detailed description and accompanying drawings.

Before any embodiments are explained in detail, it is to be understood that the disclosure is not limited in its application to the details of construction and the system of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Figure 1:
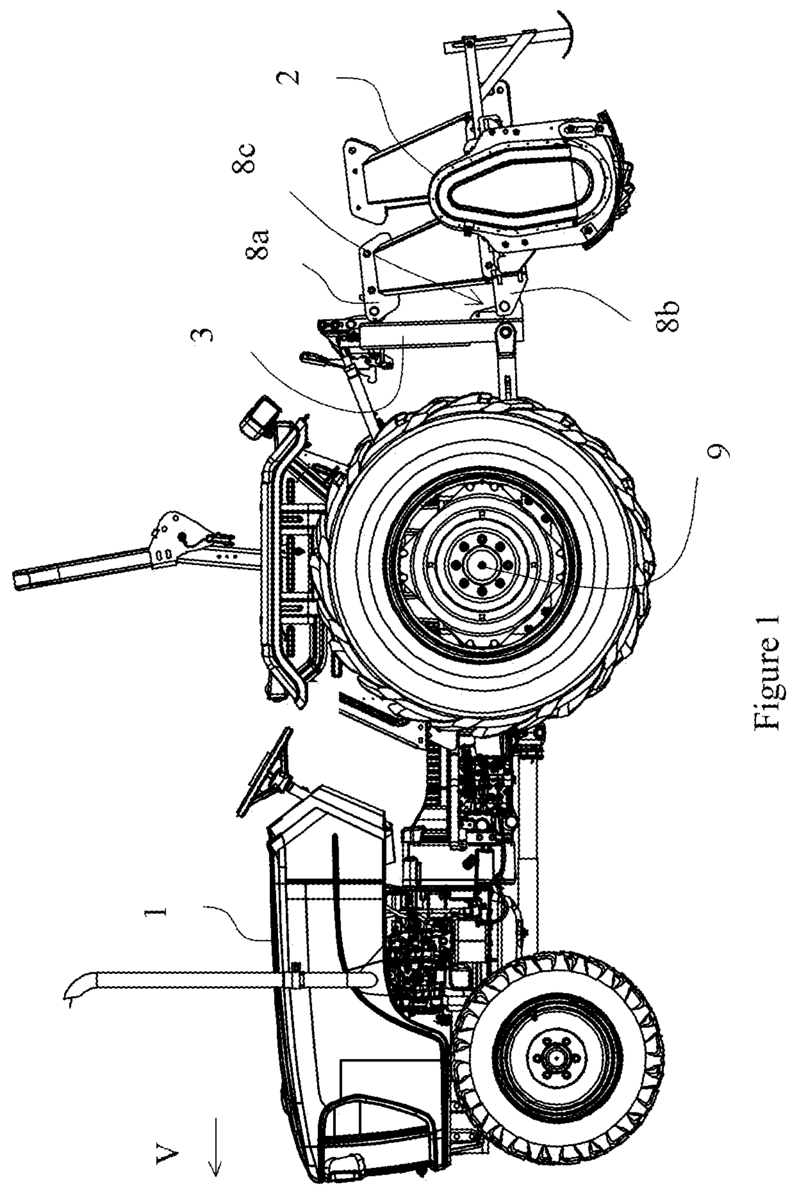
FIG. 1 is a side view of a tractor connected to an implement via an adjustable implement mounting arrangement.

FIG. 1 illustrates a work vehicle, depicted as a tractor (1) towing an implement (2) in a towing direction V. The implement (2) is coupled to the tractor (1) via an adjustable implement mounting arrangement (3), disclosed in IN467848, the content of which is included herewith by way of reference. Hereinafter, all indicated directions and location of the tractor (1), the implement (2) and the adjustable implement mounting arrangement (3), such as, forward, backward, rear, front, up, above, down, left and right shall refer to the direction of towing direction V of the tractor (1). The adjustable implement mounting arrangement (3), in accordance with the present disclosure, is required for connecting the implement (2) to a hitch (not particularly indicated) of a tractor (1) when the width of the implement (2) fails to match with the operational width of the hitch of the tractor (1).

Figure 2:
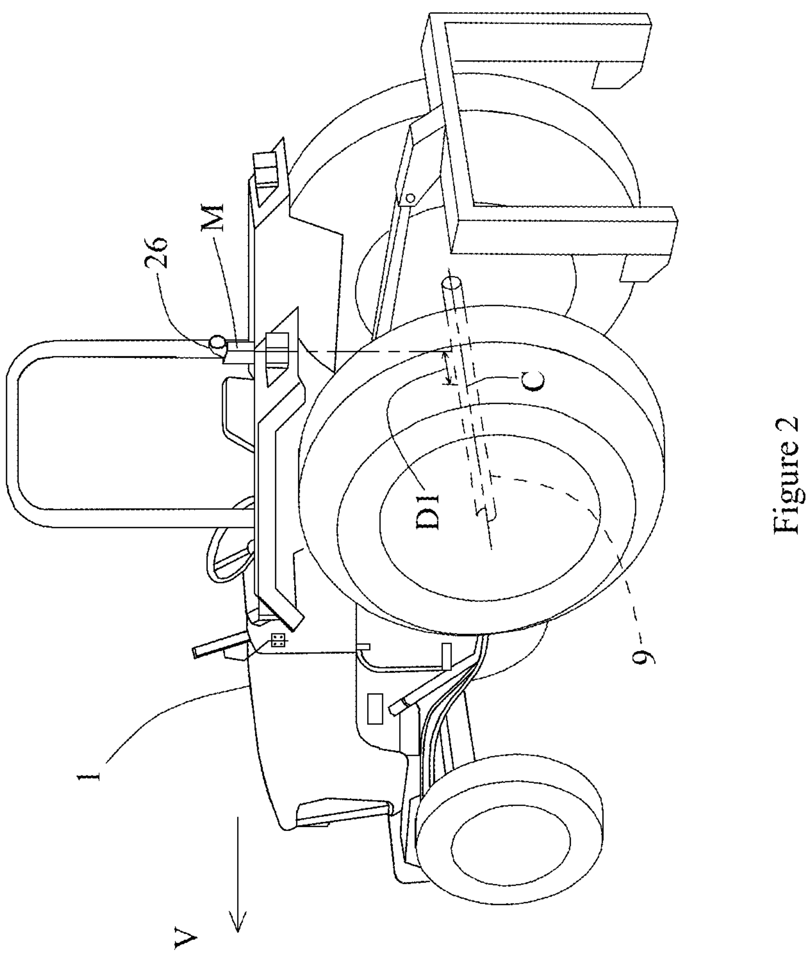
FIG. 2 is a rear perspective view of the tractor of FIG. 1 with a camera and the adjustable implement mounting arrangement.
Figure 3:
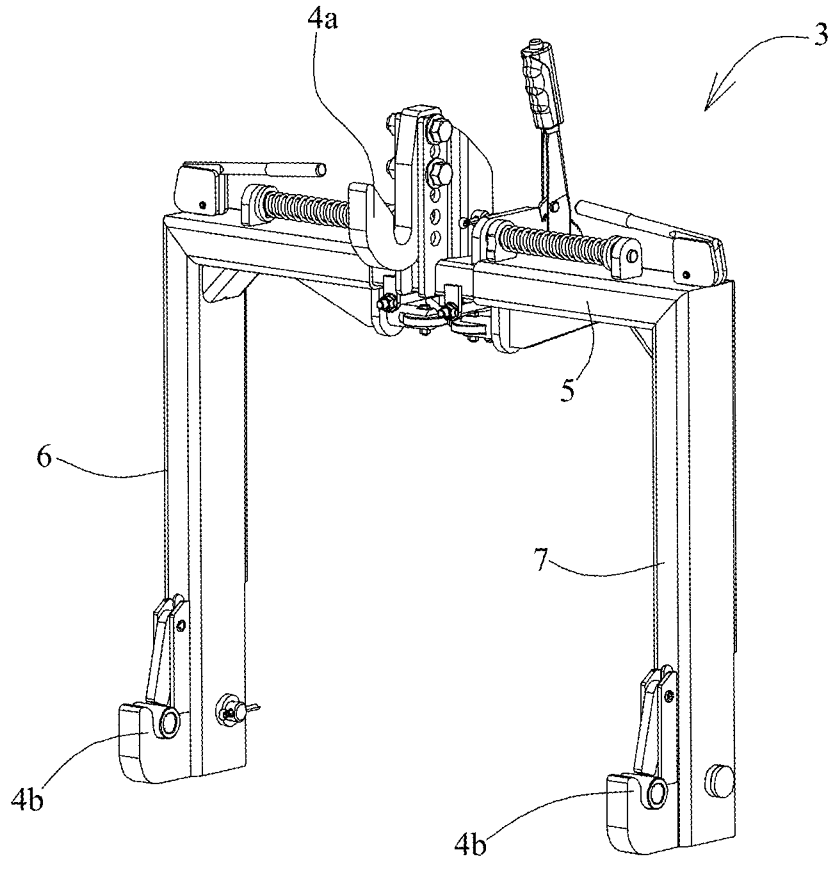
FIG. 3 is a zoomed in partial view of the adjustable implement mounting arrangement.

FIG. 2 illustrates the rear side of the adjustable implement mounting arrangement (3). With reference to FIGS. 1-3, the implement (2) cooperates with the tractor (1) via the adjustable implement mounting arrangement (3) through a center vehicle connector, hence forth termed as a first hook (4*a*) and a pair of vehicle side connectors, which will henceforth be termed as, a second hook (4*b*) and a third hook (4*c*). The first hook (4*a*) is defined on a support shaft (5) while the second hook (4*b*) and the third hook (4*c*) are defined on the distal ends of frame members (6 and 7), respectively. The first hook (4*a*) cooperates with a center implement connector (8*a*) of the implement (2) while the second hook (4*b*) and the third hook (4*c*) respectively cooperate with a pair of implement side connectors, henceforth termed as a first implement side connector (8*b*) and a second implement side connector (8*c*) of the implement (2). Thus, the tractor (1) has a pair of vehicle side connectors, that is, the second hook (4*b*) and the third hook (4*c*) and a center vehicle connector, that is, the first hook (4*a*). Similarly, the implement (2) has a center implement connector (8*a*), the first implement side connector (8*b*), and the second implement side connector (8*c*). In order to attach the tractor (1) to the implement (2), the first hook (4*a*), the second hook (4*b*), and the third hook (4*c*) are required to be respectively attached to the center implement connector (8*a*) and a pair of implement side connectors (8*b* and 8*c*).

In accordance with the present disclosure, a back-up assist system (10), as illustrated in FIG. 3, facilitates coupling a work vehicle or tractor (1) with an implement (2). The back-up assist system (10) will now be described with reference to FIGS. 1-10. The back-up assist system (10) guides the tractor (1) towards the implement (2) for respectively coupling the first hook (4*a*), the second hook (4*b*), and the third hook (4*c*) with the center implement connector (8*a*) and the pair of implement side connectors (8*b* and 8*c*), respectively. Each of the first hook (4*a*), the second hook (4*b*), and the third hook (4*c*), the center implement connector (8*a*), and the pair of implement side connectors (8*b* and 8*c*) are at an actual distance from a predefined point of the tractor (1). The predefined point of the tractor (1) is a center (C) of a rear axle (9), indicated in FIG. 1.

Figure 4:
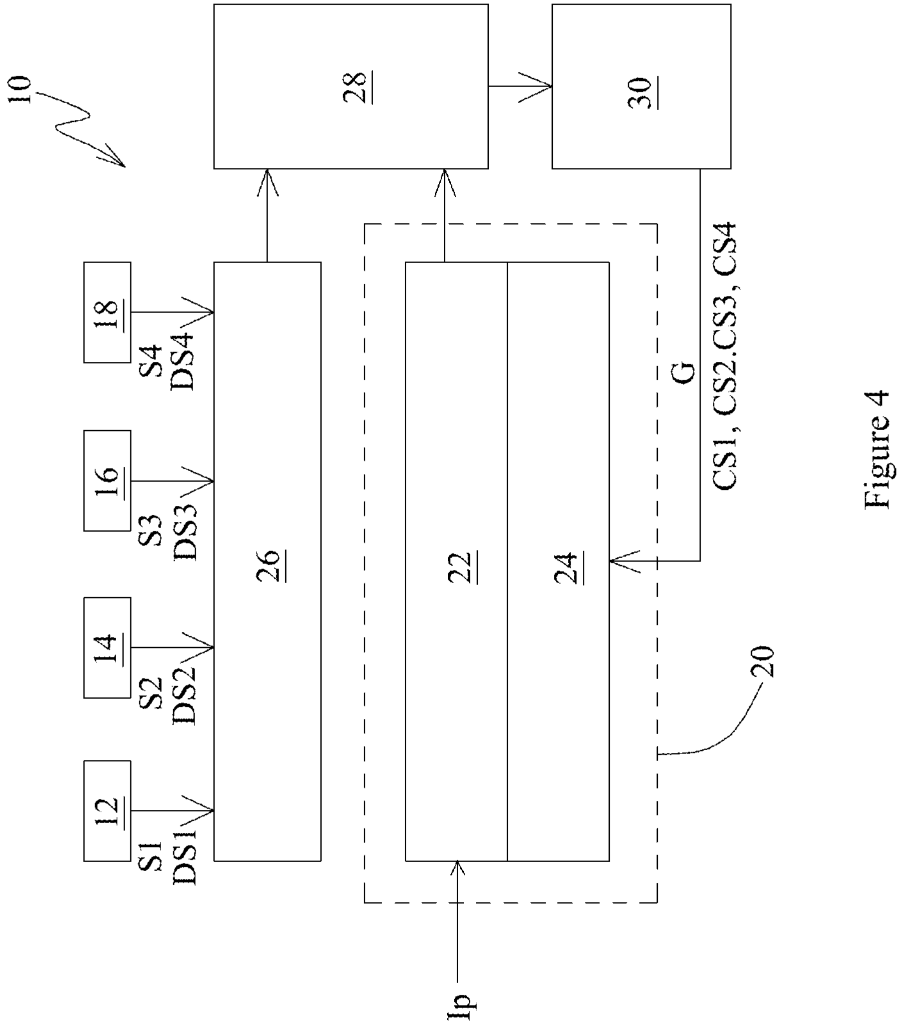
FIG. 4 is a flow chart of a back-up assist system.

As illustrated in FIGS. 3 and 4, the back-up assist system (10) has a first marker (12), a second marker (14), a third marker (16), and a fourth marker (18). The first marker (12) is positioned proximate to the center vehicle connector, that is, the first hook (4*a*) of the adjustable implement mounting arrangement (3). The second marker (14), the third marker (16), and the fourth marker (18) are positioned proximate to the center implement connector (8*a*), the implement side connector (8*b*) and the implement side connector (8*c*). The first marker (12), the second marker (14), the third marker (16), and the fourth marker (18) are a machine-readable design which may be a barcode, a QR-code, and a checkered pattern. The first marker (12), the second marker (14), the third marker (16), and the fourth marker (18) are printed on a paper that is positioned on the adjustable implement mounting arrangement (3) and the implement (2) with an adhesive. Alternatively, the marker (12), the second marker (14), the third marker (16), and the fourth marker (18) are painted on the adjustable implement mounting arrangement (3) and the implement (2).

The back-up assist system (10) has a user interface (20) having an input interface (22) and a display interface (24). The user interface (22) receives one or more user input (Ip) from operator while the display interface (24) provides the operator with visuals of a path while guiding the tractor (1) towards the implement (2). The user input (Ip) includes a type of implement and a plurality of dimensions of the vehicle with respect to the center (C) of the rear axle (9) of the tractor (1). The plurality of dimensions includes distance of each of the center vehicle connector, that is, the first hook (4*a*), the center implement connector (8*a*), the implement side connector (8*b*), and the implement side connector (8*c*) with respect to the center (C) of the rear axle (9). The user input (Ip) determines a vehicle coordinate. The vehicle coordinates correspond to an actual distance (D) of the center vehicle connector or the first hook (4*a*) with respect to the center (C) of the rear axle (9).

A vision system (26) is mounted on the tractor (1) at a mounting point (M) which is at a predefined distance (D1) with respect to the center (C) of the rear axle (9) of the tractor (1). The vision system (26) scans the first marker (12), the second marker (14), the third marker (16), and the fourth marker (18) to generate pre-scanned signals (S1, S2, S3, S4) and dynamic-scanned signals (DS1, DS2, DS3, DS4), respectively. The pre-scanned signals (S1, S2, S3, S4) are determined in the implement attached configuration while the dynamic-scanned signals (DS1, DS2, DS3, DS4) are determined in the implement detached configuration, corresponding to the mounting point (M). The pre-scanned signal (S1) includes scanned image of the first marker (12), associated with the center vehicle connector or the first hook (4*a*). Also, the pre-scanned signals (S2, S3, S3) include scanned images of one of the third marker (16) and the fourth marker (18), associated with the first implement side connector (8*b*) and the second implement side connector (8*c*).

A repository module (28) is communicably coupled to the user interface and the vision system. The repository module (28) receives the user input (Ip), the pre-scanned signals (S1, S2, S3, S4) and the dynamic-scanned signals (DS1, DS2, DS3, DS4).

A processor (30) is transmittingly coupled to the repository module (28). The processor (30) generates a calibration signals (CS1, CS2, CS3, CS4) and a visual guidance path (G) with respect to the center (C). The visual guidance path (G) is a straight path displayed on the display interface (24) as extending from the first hook (4*a*), the second hook (4*b*), and the third hook (4*c*). The guidance path (G) is a straight path which is divided into multiple segments (G1, G2, G3, G4 . . . ). The line extending from the first hook (4*a*) is termed as a center path line (32).

The pre-scanned signals (S1, S2, S3, S4) and the dynamic-scanned signals (DS1, DS2, DS3, DS4) are transposed, corresponding to the calibration distance (CS1, CS2, CS3, CS4). The calibration signals (CS1, CS2, CS3, CS4) correspond to each of the dynamic-scanned signals (DS1, DS2, DS3, DS4). The pre-scanned signals (S1, S2, S3, S4) and the dynamic-scanned signals (DS1, DS2, DS3, DS4) are determined with respect to the mounting point (M). The pre-scanned signals (S1, S2, S3, S4) and the dynamic-scanned signals (DS1, DS2, DS3, DS4) are calibrated corresponding to each of the plurality of calibration signals (CS1, CS2, CS3, CS4). The plurality of calibration signals (CS1, CS2, CS3, CS4) and the visual guidance path (G) are displayed on the display interface (24).

Figure 8:
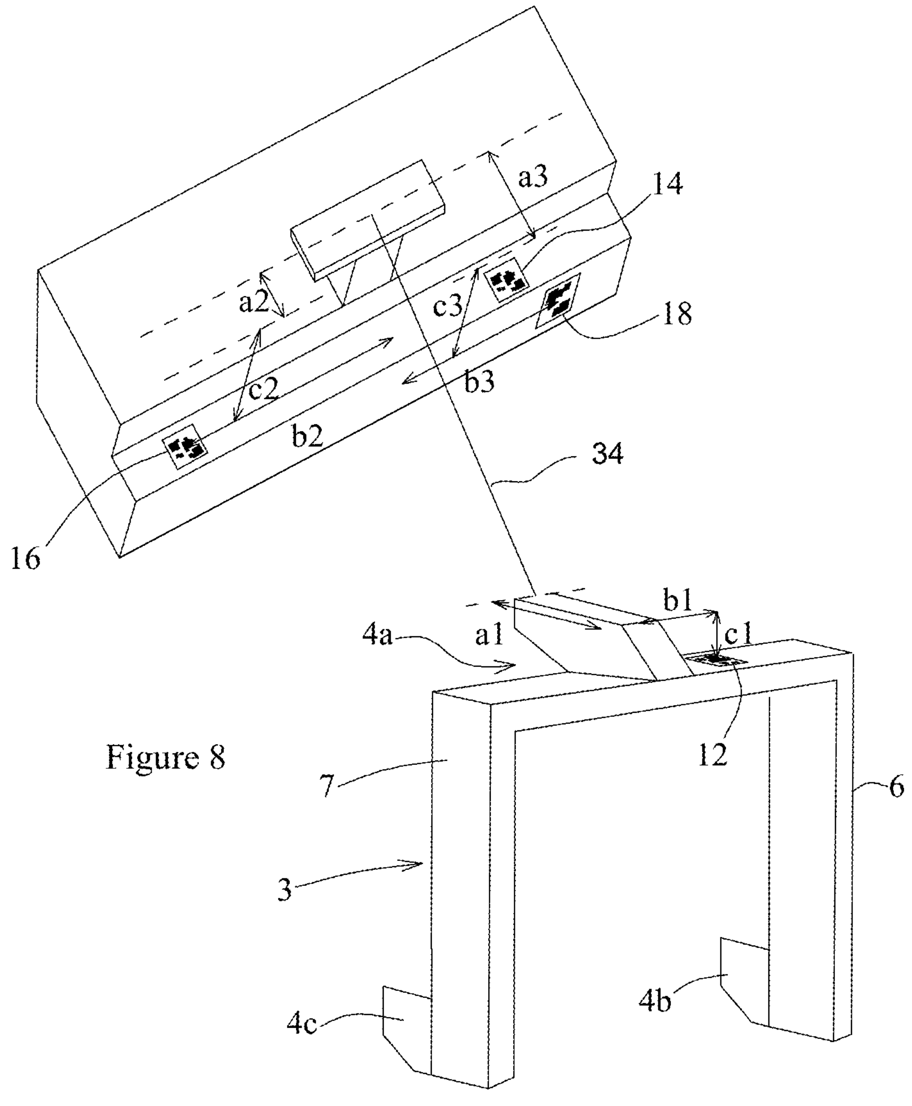
FIG. 8 is a zoomed in partial view of a plurality of markers provided on the adjustable implement mounting arrangement and the implement.
Figure 9:
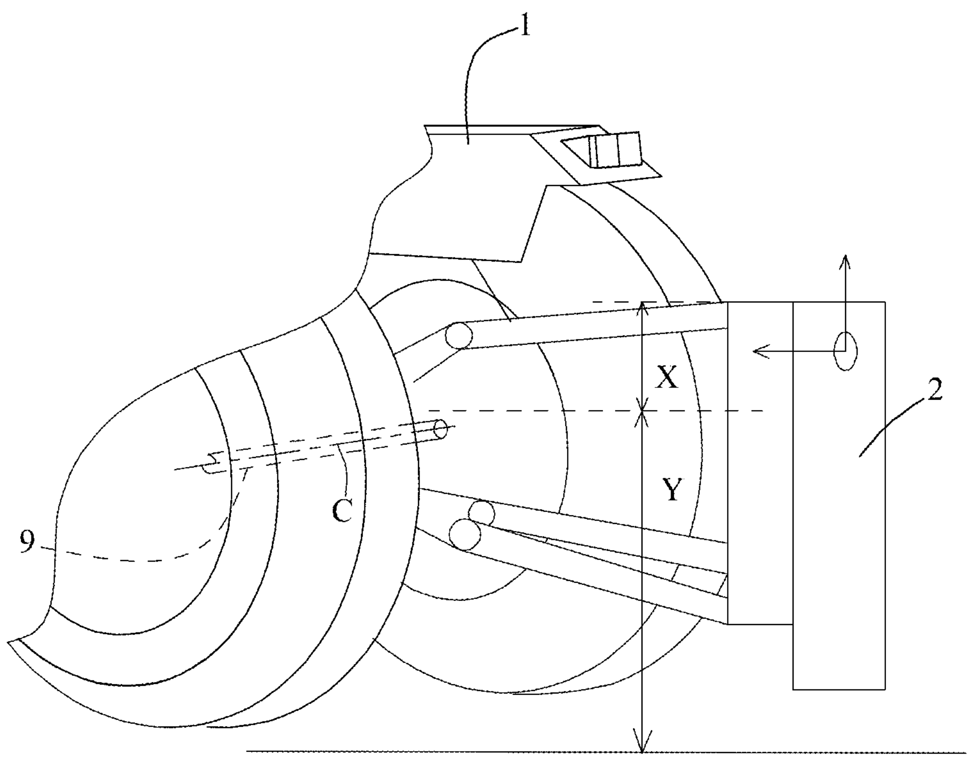
FIG. 9 is a zoomed in partial view that illustrates the height adjustment of the adjustable implement mounting arrangement with respect to the center of the rear axle.
Figure 10:
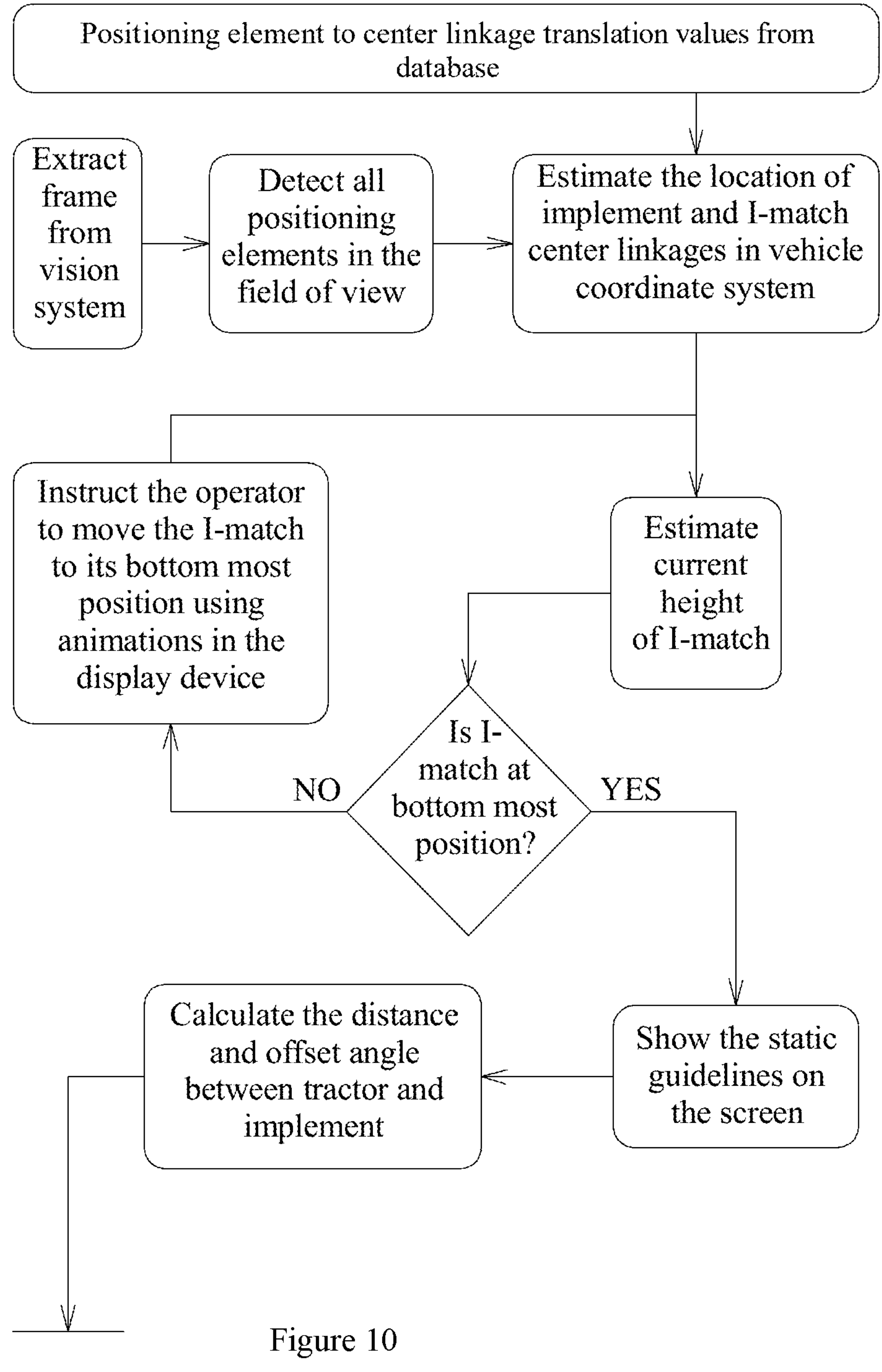
FIG. 10 is a flow chart of the method of operation of the back-up assist system, in accordance with the present disclosure.
Figure 11:
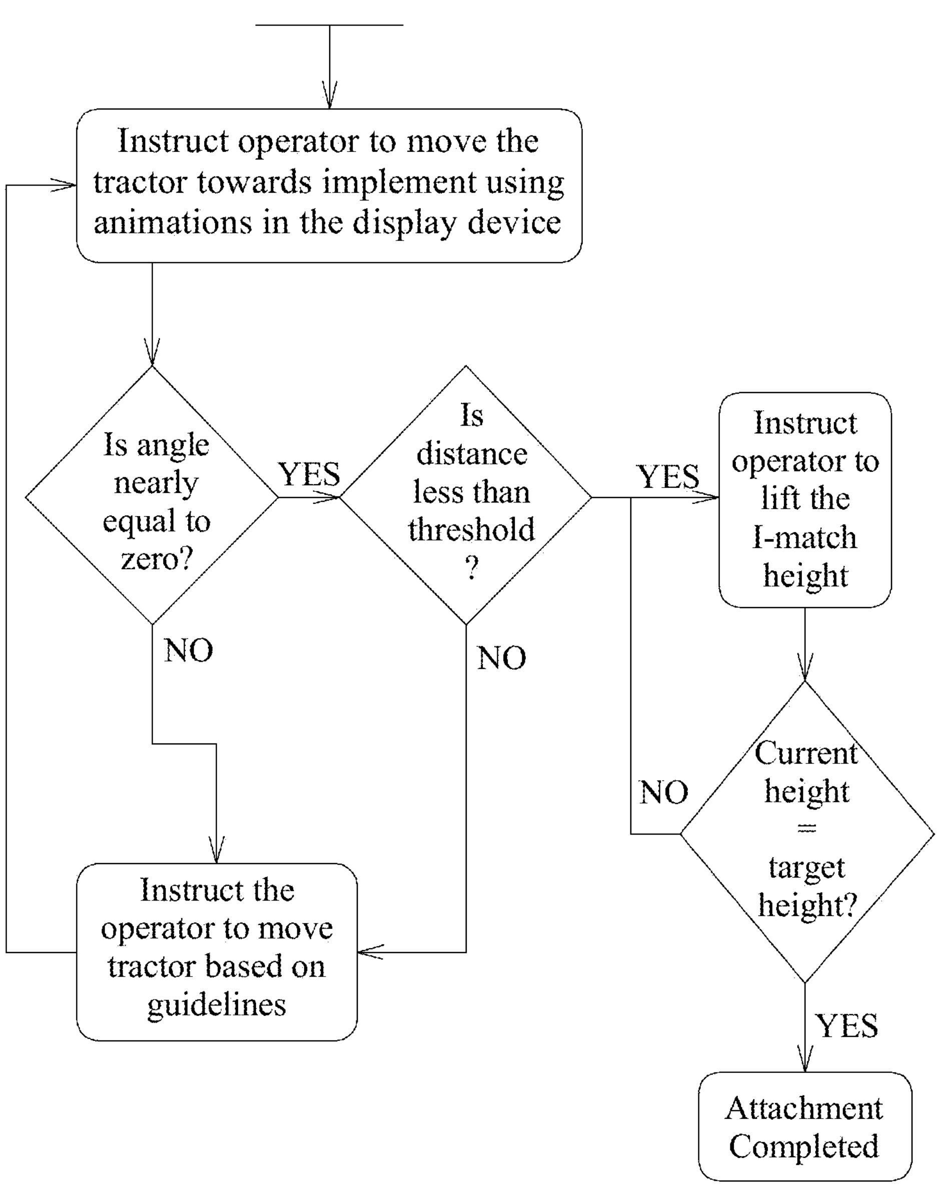
FIG. 11 is a flow chart that continues from FIG. 10.

Now referring to FIGS. 1-11, a method of operation of the back-up assist system (10) will be discussed. The vision system (26) scans the first marker (12), the second marker (14), the third marker (16), and the fourth marker (18), associated with the center vehicle connector or the first hook (4*a*), the first implement side connector (8*a*) and the second implement side connector (8*b*) when the work vehicle (1) is coupled to the implement (2). After scanning the first marker (12), the second marker (14), the third marker (16), and the fourth marker (18), the processor (30) determines the actual distance of the center vehicle connector or the first hook (4*a*), the first implement side connector (8*a*) and the second implement side connector (8*b*) from the associated markers (12, 14, 16 and 18). The distances A1, b1, c1, a2, b2, c2, a3, b3 and c3, as shown in FIG. 8, are determined with respect to the center (C) of the rear axle (9). Also, the height (x and y), as shown in FIG. 9, is determined and recorded. These scanned images and the distances a1, b1, c1, a2, b2, c2, a3, b3, and c3 along with the height (x and y) are converted into the pre-scanned signals (S1, S2, S3, S4). The pre-scanned signals (S1, S2, S3, S4), thus, indicate the position of the first marker (12), the second marker (14), the third marker (16), and the fourth marker (18), as scanned by the vision system (26) when the implement (2) is coupled to the tractor (1). This means that each of the pre-scanned signals (S1, S2, S3, S4) is allocated a vision system coordinate corresponding to position of the first marker (12), the second marker (14), the third marker (16), and the fourth marker (18) with respect to the vision system (26). The pre-scanned signals (S1, S2, S3, S4) are stored in the repository module (28).

When the tractor (1) and the implement (2) are located at a distance from each other, the tractor (1) is steered towards the implement (2) for coupling therewith. This steering of the implement (2) may be by an automatic maneuver or a manual maneuver. Alternatively, the steering may be switched between the automatic maneuver and the manual maneuver. Hereinafter, the term "operator" will refer to a person or a controller. As will be understood, the manual maneuvering of the implement (2) will be controlled by a person while automatic maneuvering of the implement (2) will be controlled by a controller (not shown). The automatic maneuvering of steering the implement (2) can be overridden in a known manner to shift to steering the implement (2) with manual maneuvering. As will be appreciated by a person skilled in the art, the tractor (1) is required to be reversed towards the implement (2), such that, the first hook (4*a*), the second hook (4*b*), and the third hook (4*c*) of the hitch or the adjustable implement mounting arrangement (3) connects with the center implement connector (8*a*), the first implement side connector (8*b*), and the second implement side connector (8*c*) of the implement (2). As the tractor (1) is reversed towards the implement (2), the vision system (26) captures successive frames of the first marker (12), the second marker (14), the third marker (16), and the fourth marker (18), in real time. The successive frames of the first marker (12), the second marker (14), the third marker (16), and the fourth marker (18), are captured or scanned and a plurality of dynamic-scanned signals (DS1, DS2, DS3, DS4) are determined, corresponding to the pre-scanned signals (S1, S2, S3, S4), respectively. The plurality of calibration signals (CS1, CS2, CS3, CS4) are generated corresponding to dynamic-scanned signals (DS1, DS2, DS3, DS4), thereby creating the visual guidance path (G).

Each of the dynamic-scanned signals is calibrated to the vehicle coordinate which is calibrated with respect to the center (C) of the rear axle (9). Now a center line (34) is determined by scanning the first marker (12) and the fourth marker (18) associated with the center vehicle connector or first hook (8*a*) of the tractor (1) and the center implement connector (8*a*) of the implement (2). A first connection line (36) and a second connection line (38) are generated. The first connection line (36) and the second connection line (38) extend from the first vehicle side connector (8*b*) and the second vehicle side connector (8*c*) of the tractor (1).

As the tractor (1) is reversed towards the implement (2), the vision system (26) continuously scans the first marker (12), the second marker (14), the third marker (16), and the fourth marker (18) to generate the dynamic-scanned signals (DS1, DS2, DS3, DS4), respectively. The center line (34) is indicated on the display interface (24) along with the visual guidance path (G). The center line (34) is determined by scanning the first marker (12) and the fourth marker (18).

Figure 5:
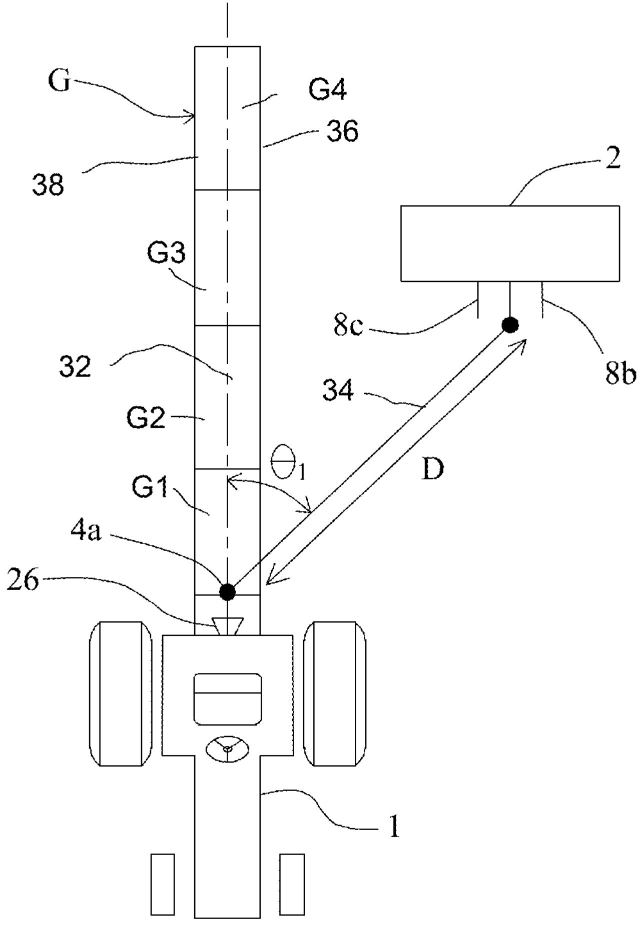
FIG. 5 is a schematic of guiding the tractor towards the implement with the back-up assist system.
Figure 6:
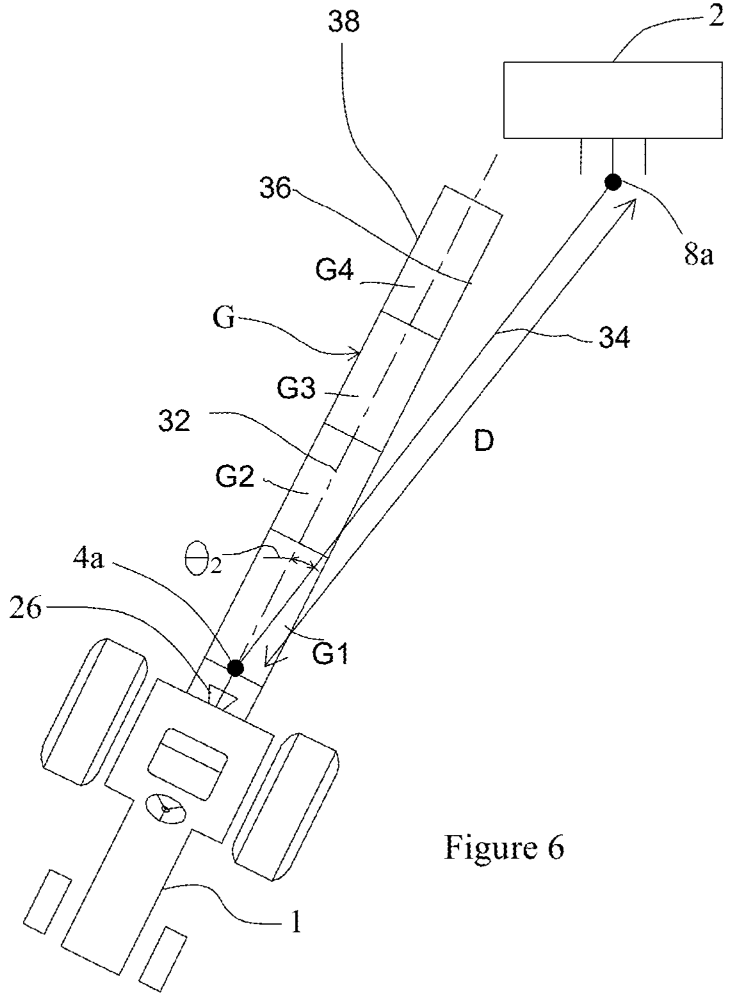
FIG. 6 is a schematic of guiding the tractor towards the implement with the back-up assist system.
Figure 7:
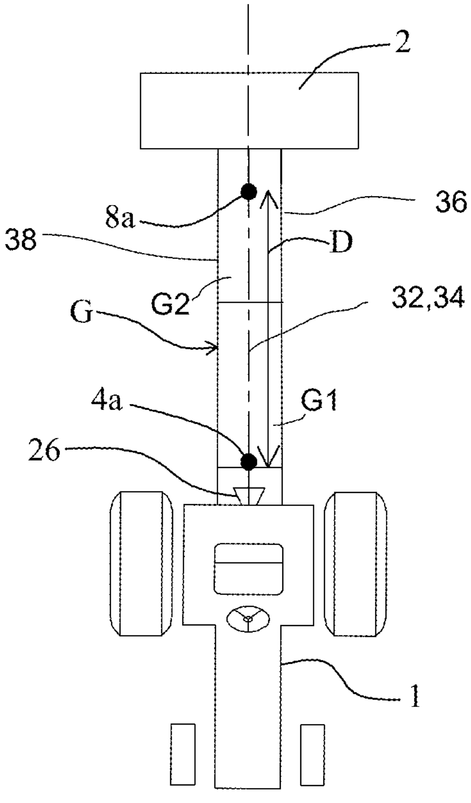
FIG. 7 is a schematic of guiding the tractor towards the implement with the back-up assist system.

Now as shown in FIGS. 5-7, the visual guidance path (G) extends inline from the tractor (1) and the center line (34) indicates the connection path of the first hook (4*a*) and the center implement connector (8*a*). The tractor (1) is reversed towards the implement (2) until the angle (01), indicated in FIG. 5, is formed between the center path line (32) of the visual guidance path (G) and the center line (34) is minimized to angle (02), indicated in FIG. 6. When the angle (02) further reduces to zero degrees, which implies that the center line (34) superimposes over the center path line (32). Also, the first connection line (36) and the second connection line (38), now indicate alignment of the first vehicle side connector (8*b*) and the second vehicle side connector (8*c*) of the tractor (1) with the first implement side connector (8*b*) and the second implement side connector (8*c*). As the tractor (1) reverses towards the implement, the number of segments (G1, G2, G3, G4, . . . ), indicated in FIG. 5 and FIG. 6 reduces to segments (G1, G2) as indicated in FIG. 7 until the tractor (1) is coupled to the implement (2). After the center line (34) superimposes over the center path line (32), the hitch or the adjustable implement mounting arrangement (3) is aligned by continuous determination of the dynamic-scanned signals (DS1, DS2, DS3, DS4). This is done by determining the distance a1, b1, c1, a2, b2, c2, a3, b3 and c3, as shown in FIG. 8, with respect to the center (C) of the rear axle (9). Simultaneously, the height of the adjustable implement mounting arrangement (3) is indicated to be adjusted with respect to the center (C) of the rear axle (9) between the X portion or the Y portion, as shown in FIG. 9. The operator is required to change the height of the adjustable implement mounting arrangement (3) along X portion and Y portion. This helps in ensuring that the first hook (4*a*), the second hook (4*b*), and the third hook (4*c*) are aligned to couple with the center implement connector (8*a*), the first implement side connector (8*b*), and the second implement side connector (8*c*).

The back-up assist system (10) and the method thereof, helps in guiding the tractor (1) to connect with the implement (2) with precision without necessitating additional manpower for such activity.

The present disclosure has several technical advancements, including but not limited to the realization of: a system for precision connection of a tractor with an implement without additional human assistance; determining an estimated angle and distance between an implement and a work vehicle; and determining a target height of the hitch with respect to the implement.

While the foregoing specification has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

Various features are set forth in the following claims.

What is claimed is:

1. A back-up assist system for coupling a work vehicle to an implement in a detached configuration to an attached configuration via at least a vehicle side connector and a center vehicle connector of the work vehicle respectively with corresponding at least one implement side connector and a center implement connector of the implement, each of the at least one vehicle side connector, the center vehicle connector, the at least one implement side connector, and a center implement connector being at an actual distance from a predefined point of the work vehicle, the back-up assist system comprising:

a user interface having an input interface and a display interface, the user interface being adapted to receive at least one user input via the input interface;

at least one marker disposed proximate to each of the center vehicle connector, the center implement connector, the first implement side connector, and the second implement side connector;

a vision system mounted on the work vehicle at a mounting point at a predefined distance with respect to a predefined point, the vision system being configured to scan the at least one marker and generate a plurality of pre-scanned signals and a plurality of dynamic-scanned signals, respectively, in the implement attached configuration and the implement detached configuration, corresponding to the mounting point;

a repository module communicably coupled to the user interface and the vision system, the repository module being adapted to receive the user input, the plurality of pre-scanned signals, and the plurality of dynamic-scanned signals; and a processor communicably coupled to the repository module, the processor being configured to generate a plurality of calibration signals and a visual guidance path with respect to the predefined point, each of the plurality of pre-scanned signals and a plurality of dynamic-scanned signals is transposed corresponding to the plurality of calibration signals.

2. The system as claimed in claim 1, wherein the at least one user input is selected from a group consisting of a type of implement and a plurality of dimensions of the vehicle with respect to the predefined point.

3. The system as claimed in claim 1, wherein the at least one user input is a distance of each of the center vehicle connector, the first attachment side connector, and the second attachment side connector with respect to the predefined point.

4. The system as claimed in claim 1, wherein the predefined point is defined on a rear axle of the work vehicle.

5. The system as claimed in claim 1, wherein the user input determines a vehicle coordinate, the vehicle coordinate corresponds to an actual distance of the center vehicle connector, the first attachment side connector, the second attachment side connector, and the vision system with respect to a the predefined point on the work vehicle, the predefined point being a center of the rear axle of the work vehicle.

6. The system as claimed in claim 1, wherein the marker is a machine-readable design selected from a group consisting of a barcode, a QR-code, and a checkered pattern.

7. The system as claimed in claim 1, wherein the marker is coupled to a paper, the marker being mounted on the work vehicle and the implement with an adhesive.

8. The system as claimed in claim 1, wherein the marker is painted on the work vehicle and the implement.

9. The system as claimed in claim 1, wherein the pre-scanned signals have a scanned image of the marker associated with the center vehicle connector.

10. The system as claimed in claim 1, wherein the pre-scanned signals have a scanned image of at least one of the markers associated with the first implement side connector and the second attachment side connector.

11. The system as claimed in claim 1, wherein the plurality of dynamic-scanned signals has a scanned image of the marker associated with the center vehicle connector.

12. The system as claimed in claim 1, wherein the plurality of dynamic-scanned signals has at least one of the markers associated with the first attachment side connector and the second attachment side connector.

13. The system as claimed in claim 1, wherein the plurality of calibration signals correspond to each of the dynamic-scanned signals.

14. The system as claimed in claim 1, wherein the plurality of pre-scanned signals and the plurality of dynamic-scanned signals are determined with respect to the mounting point.

15. The system as claimed in claim 1, wherein the plurality of pre-scanned signals and the plurality of dynamic-scanned signals are calibrated corresponding to each of the plurality of calibration signals.

16. The system as claimed in claim 1, wherein the plurality of calibration signals and the visual guidance path are selectively displayed on the user interface via the display interface.

17. The system as claimed in claim 1, wherein a steering of the work vehicle towards the implement along the visual guidance path is at least one of a manual maneuver and an automatic maneuver.

18. The system as claimed in claim 1, wherein a steering of the work vehicle towards the implement is switchable from an automatic maneuver to a manual maneuver.

19. A method for assisting back-up of a work vehicle towards an implement for coupling a first vehicle side connector, a second vehicle side connector, and a center vehicle connector of the work vehicle and a first attachment side connector, a second attachment side connector, and a center attachment connector of the implement, the method comprising the steps of:

scanning at least one marker, associated with center vehicle connector, the first attachment side connector, and the second attachment side connector, by a vision system in a position of the work vehicle coupled to the implement;

determining a plurality of pre-scanned signals corresponding to the step of scanning;

allocating a vision system coordinate to the plurality of pre-scanned signals corresponding to a position of each of the markers with respect to the vision system;

repositing each of the pre-scanned signals from the step of allocating;

steering the work vehicle, spaced apart from the implement, towards the implement;

acquiring successive frames, in real time, by the vision system for at least one of the markers, during the step of steering;

configuring a plurality of dynamic-scanned signals corresponding to the pre-scanned signals in the step of allocating;

calibrating each of the dynamic-scanned signals to a vehicle coordinate calculated with respect to a predefined point of the work vehicle;

determining a center line connecting the center vehicle connector of the work vehicle and the center attachment connector of the implement;

generating connection lines connecting the first vehicle side connector and a second vehicle side connector of the work vehicle with the first implement side connector and the second implement side connector of the implement, respectively, corresponding to the step of calibrating;

estimating a visual guidance path between the work vehicle and the implement corresponding to an angle therebetween; and adjusting a position of the first vehicle side connector, the second vehicle side connector, and the center vehicle connector corresponding to the step of acquiring, determining and generating.

20. The method as claimed in claim 19, wherein the step of steering includes a step of a manual maneuvering and a step of an automatic maneuvering, the manual maneuvering being controlled by a person, the automatic maneuvering being controlled by a controller.

* * * * *